United States Patent [19]

Saga et al.

[11] Patent Number: 5,682,285
[45] Date of Patent: Oct. 28, 1997

[54] MAGNETIC TAPE MEMORY DEVICE PRECISELY POSITIONING MAGNETIC TAPE

[75] Inventors: Hideaki Saga, Fussa; Yoh Kamei, Kokubunji; Nobuki Matsui, Musashino, all of Japan

[73] Assignee: Teac Corporation, Japan

[21] Appl. No.: 643,861

[22] Filed: May 7, 1996

Related U.S. Application Data

[63] Continuation of Ser. No. 260,177, Jun. 15, 1994, abandoned.

[30] Foreign Application Priority Data

Jun. 23, 1993 [JP] Japan ..................... 5-152262

[51] Int. Cl.⁶ ............................................. G11B 15/62
[52] U.S. Cl. ............................................. 360/130.21
[58] Field of Search ................... 360/130.21, 85, 360/130.22, 130.3, 130.31, 130.32, 130.33; 242/346

[56] References Cited

U.S. PATENT DOCUMENTS 5,074,486  12/1991  Vollmann .................. 360/130.33

FOREIGN PATENT DOCUMENTS 98555    6/1985  Japan ..................... 360/130.21
4-27607  5/1992  Japan.
6-139662 5/1994  Japan.

Primary Examiner—Stuart S. Levy
Assistant Examiner—George J. Letscher
Attorney, Agent, or Firm—Andrus, Sceales, Starke & Sawall

[57] ABSTRACT

A magnetic tape memory device in which a data cartridge containing a magnetic tape stretched by guide rollers is inserted for recording or reproducing information includes a head unit for recording or reproducing information and a positioning unit which positions the magnetic tape relative to the head unit by coming in contact with one of the guide rollers.

6 Claims, 6 Drawing Sheets

MAGNETIC TAPE MEMORY DEVICE PRECISELY POSITIONING MAGNETIC TAPE

The present application is a continuation application of U.S. patent application Ser. No. 08/260,177, filed Jun. 15, 1994, and now abandoned.

BACKGROUND OF THE INVENTION

The present invention generally relates to magnetic tape memory devices, and more particularly relates to a magnetic tape memory device having the function of precisely positioning a magnetic tape relative to a magnetic head.

In computers, for example, the magnetic tape is used as an additional large volume memory media or as a backup memory media for copying information stored in memory devices such as hard-discs. A magnetic tape is wrapped around a pair of tape reels which is contained in a data cartridge, and a torque roller for rotating the pair of reels is provided on the front face of the data cartridge. When the data cartridge is inserted into a magnetic tape memory device, the magnetic tape memory device rotates the pair of reels by conveying torque through the torque roller. The magnetic tape is driven just inside the front face of the data cartridge, and the recording or reproducing of information is carried out by a magnetic head which is positioned so as to touch the magnetic tape.

In recording or reproducing information, the positioning of the magnetic head relative to the magnetic tape must be precise so that recording or reproducing signal outputs are sufficiently large and, at the same time, the magnetic tape is not damaged by the contact with the magnetic head. There is a method to use a rotating head instead of a fixed conventional head in order to increase the memory volume of the magnetic tape memory device, and the above mentioned positioning is especially important in using this method.

FIG. 1 shows a plan view of a magnetic tape memory device using a rotating head. In FIG. 1, a data cartridge 12 is to be inserted into a magnetic tape memory device 11 between guide plates 11b and 11c. The magnetic tape memory device 11 comprises a high speed rotation mechanism 15 for driving a magnetic tape at a high speed, a low speed rotation mechanism 16 for driving a magnetic tape at a low speed, and a switching mechanism 17 for switching from one of these rotation mechanisms to another.

In the high speed rotation mechanism 15, a high speed motor 15b on a motor base 15a is provided with a worm-wheel 15c, and a wheel 15d is fixed to the worm-wheel 15c. A belt 18a is looped around the wheel 15d and an idler 18, and the torque of the worm-wheel 15c is conveyed to the idler 18 through the belt 18a. A motor base 15a can move around a rod 15e in the direction shown as A–B. The motor base 15a is pushed in the direction A by a spring 15h which is looped around the rod 15e and held between a pin 15f on a frame 11a and a pin 15g on the motor base 15a.

In the low speed rotation mechanism 16, worm 16b is provided on the rod of a motor 16a. When low speed rotation is required, the switching mechanism 17 makes the worm 16b touch the worm-wheel 15c, and the torque of the motor 16a is conveyed to the idler 18. When high speed rotation is required, the switching mechanism 17 keeps the worm 16b away from the worm-wheel 15c. The switching mechanism 17 is driven by a motor 17a.

The magnetic tape memory device 11 further comprises rotating magnetic heads 14. A plurality of the magnetic heads 14e are provided on the perimeter of a head holder 14a at equal predetermined intervals, and the head holder 14a is rotated by a head motor 14b. The diameter of the head holder 14a is designed to be larger than the width of the magnetic tape. Tape guide 14c and 14d, which guide the magnetic tape, stand on both sides of the head holder 14, and are fixed on the frame 11a.

In FIG. 1, the data cartridge 12 has grooves 19a and 19b on both sides thereof, and is provided inside with a torque roller 20.

FIGS. 2A and 2B are diagonal views of the data cartridge 12, and FIGS. 3A and 3B are a plane view and a front view of the data cartridge 12, respectively. In these Figs, a cassette 21 has grooves 19a and 19b on both sides thereof for guiding the data cartridge 12 into the magnetic tape memory device 11. Also, locking grooves 19c and 19d for locking the data cartridge 12 in the magnetic tape memory device 11 are provided on both sides of the cassette 21. Furthermore, a lid 23 which opens as shown in FIG. 2B when the data cartridge 12 is inserted is provided on an opening 22 on the front face of the data cartridge 12. When the data cartridge 12 is not inserted into the magnetic tape memory device 11, the lid 23 is closed to protect a magnetic tape 12a. Another opening 24 makes it possible for the torque roller 20 to touch the idler 18.

As shown in FIGS. 3A and 3B, a pair of reels 25 and 26 which the magnetic tape 12a is wrapped around are provided inside the data cartridge 12. Between the two reels 25 and 26, the magnetic tape 12a is stretched by guide rollers 25a and 26a so as to be positioned just inside the front face of the data cartridge 12. A torque belt 29 which is looped around the torque roller 20 and belt guide rollers 27 and 28 is pushed against the magnetic tape 12a wrapped around the reels 25 and 26. Thus, when the torque roller 20 is rotated, the torque belt 29 moves without sliding against the magnetic tape 12a, which is thereby driven at a desired speed.

FIG. 4 shows the data cartridge 12 and the rotating magnetic head 14 when the data cartridge 12 is inserted into the magnetic tape memory device 11. In FIG. 4, the data cartridge 12 is inserted along the grooves on the guide plate 11b and 11c, and is positioned by the ends of the grooves. The magnetic tape 12a is pushed lightly against the tape guides 14c and 14d to be positioned relative to the magnetic head 14. With reference to FIG. 1, the idler 18 is pushed by the torque roller 20 so that the motor base 15a is shifted in the direction B. Since the spring 15h pushes back the motor base 15a in the direction A, the idler 18 is pushed against the torque roller 20, which is thereby rotated at a desired rate.

When the magnetic tape memory device 11 is recording or reproducing information, the magnetic head 14 should touch the magnetic tape 12a. A stronger pressure applied to the magnetic tape 12a by the magnetic head 14 brings about an increase in the volume of the output signal for recording or reproducing, but may also lead to the scraping of the magnetic surface of the magnetic tape 12a and to reducing its life. On the other hand, if the pressure is too weak, a problem arises in that the volume of the output signal becomes too weak.

The positioning of the magnetic tape 12a relative to the magnetic head 14 is affected by the positioning of the data cartridge 12 relative to the tape guides 14c and 14d and the positioning of the tape guides 14c and 14d relative to the magnetic head 14. The tape guides 14c and 14d carry out positioning of the magnetic tape 12a in the direction perpendicular to the surface of the magnetic tape 12a and, also, in the direction along the width of the magnetic tape 12a by means of cuts which are made on the tape guides 14c and 14d and are slightly larger than the width of the magnetic tape 12a.

The data cartridge 12 is positioned when it is stopped by the ends of the grooves on the guide plates 11b and 11c, magnetic tape 12a being pushed against the tape guides 14c and 14d. Thus, the pressure applied by the tape guides 14c and 14d on the magnetic tape 12a is determined by the positioning of the data cartridge 12. In this positioning, the problem is that there are manufacturing variations in the data cartridge 12. As described above, the guide rollers 25a and 26a stretch the magnetic tape 12a just inside the front face of the cassette 21. Thus, even if the cassette 21 is positioned correctly, the position of the magnetic tape 12a relative to the tape guides 14c and 14d depends on the position of the guide rollers 25a and 26a in the cassette 21. Thus, variations in this position due to manufacturing variations cause variations in the position of the magnetic tape 12a relative to the tape guides 14c and 14d, and, thus, variations in the pressure applied by the tape guides 14c and 14d on the magnetic tape 12a.

The positioning of the magnetic tape 12a relative to the magnetic head 14 further depends on the positioning of the tape guides 14c and 14d relative to the magnetic head 14. Variations in the alignment of the magnetic head 14 with the tape guides 14c and 14d causes variations in the pressure applied by the magnetic head 14 on the magnetic tape 12a, and, also, causes variations in the positioning of the magnetic tape 12a in the direction along its width.

Thus, in the magnetic tape memory device field, there is a need for a magnetic tape memory device which can precisely position a magnetic tape relative to its magnetic head.

SUMMARY OF THE INVENTION

It is a general object of the present invention to provide a magnetic tape memory device which satisfies the need described above.

It is another and more specific object of the present invention to provide a magnetic tape memory device which can precisely position a magnetic tape relative to a magnetic head.

In order to achieve the objects described above, a magnetic tape memory device according to the present invention in which a data cartridge containing a magnetic tape stretched by guide rollers is inserted for recording or reproducing information includes a head unit for recording or reproducing information and a positioning unit for positioning the magnetic tape relative to the head unit by coming in contact with one of the guide rollers.

The magnetic tape memory device according to the present invention positions a magnetic tape relative to the magnetic head on the basis of the position of one of the guide rollers, instead of the position of the cassette of the data cartridge, which rollers stretch the magnetic tape just inside the front face of the cassette. Also, the positioning unit which positions the guide roller can be formed integrally with the head unit. Thus, the magnetic tape can be positioned relative to the magnetic head more precisely than in the configuration used in the prior art.

Other objects and further features of the present invention will be apparent from the following detailed description when read in conjunction with the accompanying drawings.

DESCRIPTION OF THE PREFERRED EMBODIMENTS

Figure 5:
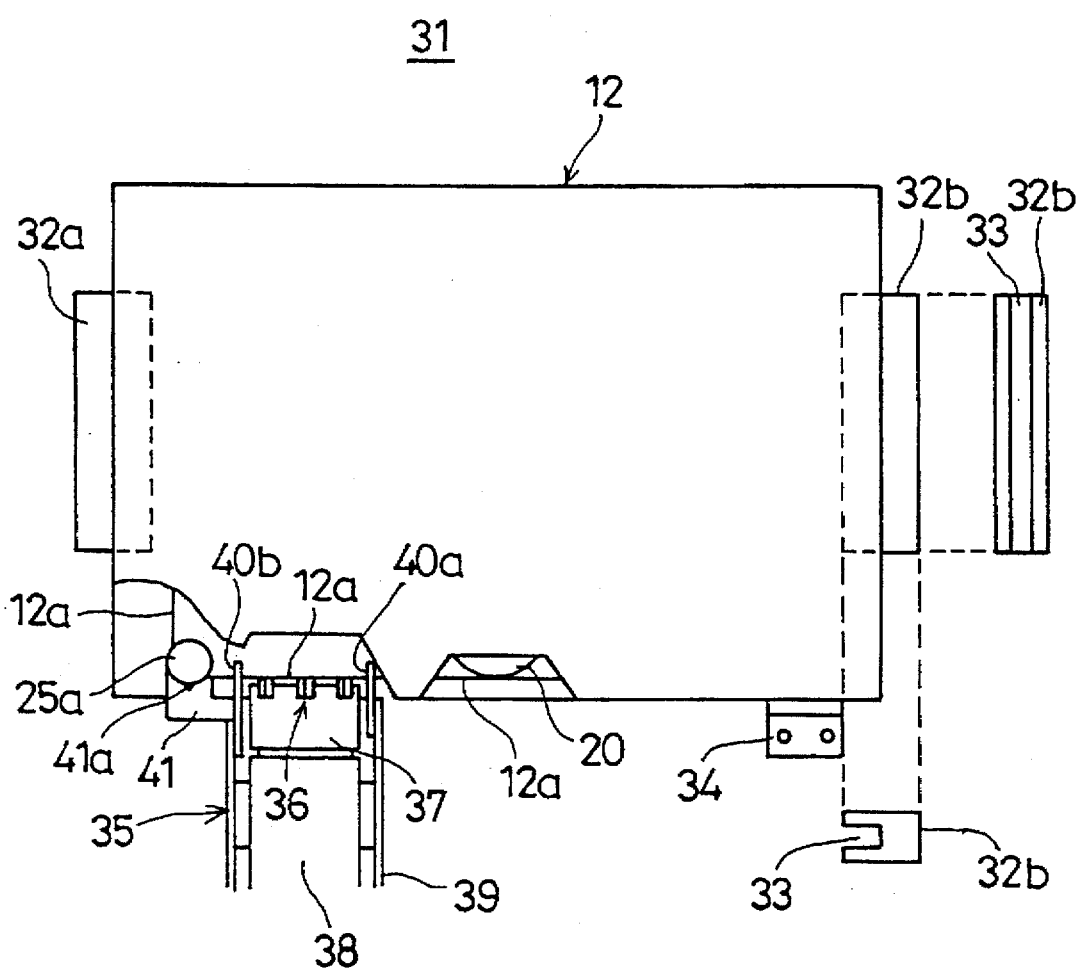
FIG. 5 is a plan view of the magnetic head unit which is positioned relative to a data cartridge in the magnetic tape memory device according to the present invention.

A preferred embodiment of the present invention is shown in FIG. 5. In FIG. 5, the data cartridge 12 is inserted into a magnetic tape memory device 31, and is positioned relative to magnetic heads 36.

The magnetic tape memory device 31 is provided with guide plates 32a and 32b each having a groove 33 which the data cartridge 12 is fit into. The grooves 33 guide and hold the data cartridge 12. Also, the magnetic tape memory device 31 has a stopper 34 which comes in contact with the right hand side of the front face of the data cartridge 12 to position this side. A cartridge guide 41 positions the left hand side of the data cartridge 12. Thereby the magnetic head 36 is appropriately positioned relative to the magnetic tape 12a, and can record or reproduce information.

Figure 6A:
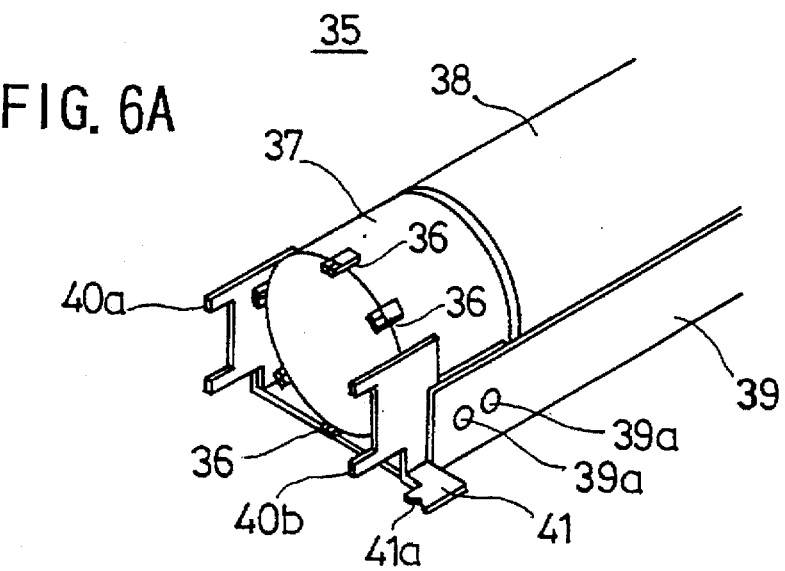
FIGS. 6A and 6B are an isometric view and a front view, respectively, of a magnetic head unit having a cartridge guide for positioning a data cartridge in the magnetic tape memory device according to the present invention.
Figure 6B:
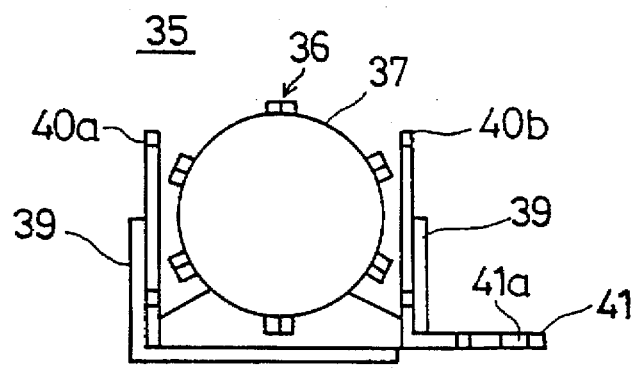

FIG. 6A is an isometric view of a head unit 35, shown in FIG. 5, which is comprised of the magnetic heads 36 and their peripherals. FIG. 6B is a front view of the head unit 35. The head unit 35 shown in FIGS. 6A and 6B is of a rotating type, and a plurality of the magnetic heads 36 (six in this embodiment) are provided at equal intervals on the perimeter of a cylindrical head holder 37 to protrude from the front face of the head holder 37. A head motor 38 rotates the head holder 37, and, thus, the magnetic heads 36 revolve around the center of the head holder 37. The head motor 38 to which the head holder 37 is attached is connected to a head base 39 so as to be able to move vertically. The fact that the head motor 38 is movable is one of the characteristics of a rotating magnetic head, but is not essential to the present invention.

On both sides of the head holder 37 provided with the magnetic heads 36, tape guides 40a and 40b which are each provided with a cut for guiding the magnetic tape 12a are attached to the head base 39 with screws 39a. The tape guides 40a and 40b may be integrally formed with the head base 39. The cartridge guide 41 for positioning the data cartridge 12 is integrally formed on the bottom of the tape guide 40b. The cartridge guide 41 may be attached to the bottom of the tape guide 40b with a screw or the like. The cartridge guide 41 has a V-shaped cut 41a in it.

Figure 1:
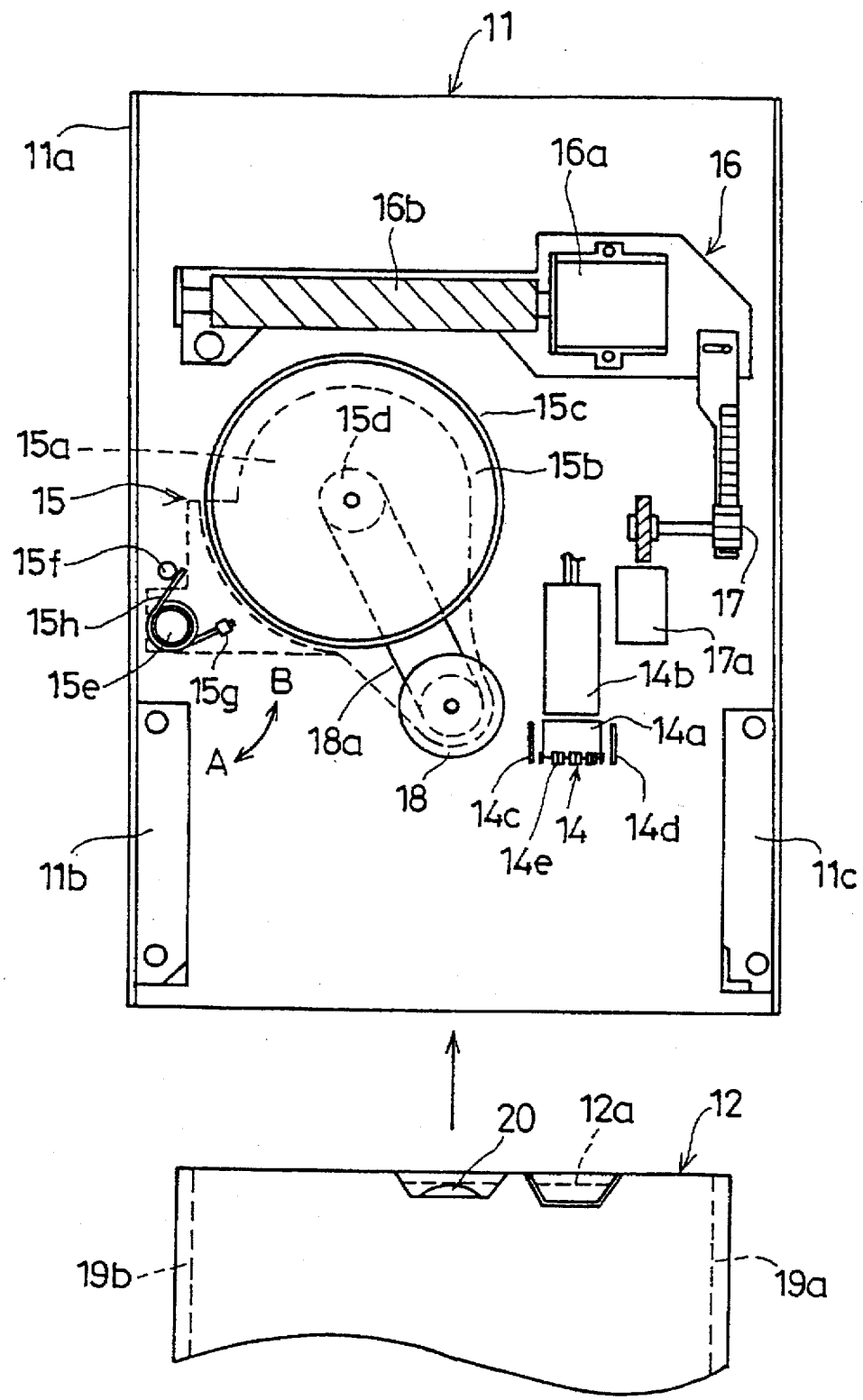
FIG. 1 is a plan view of a magnetic tape memory device having rotating magnetic heads.
Figure 2A:
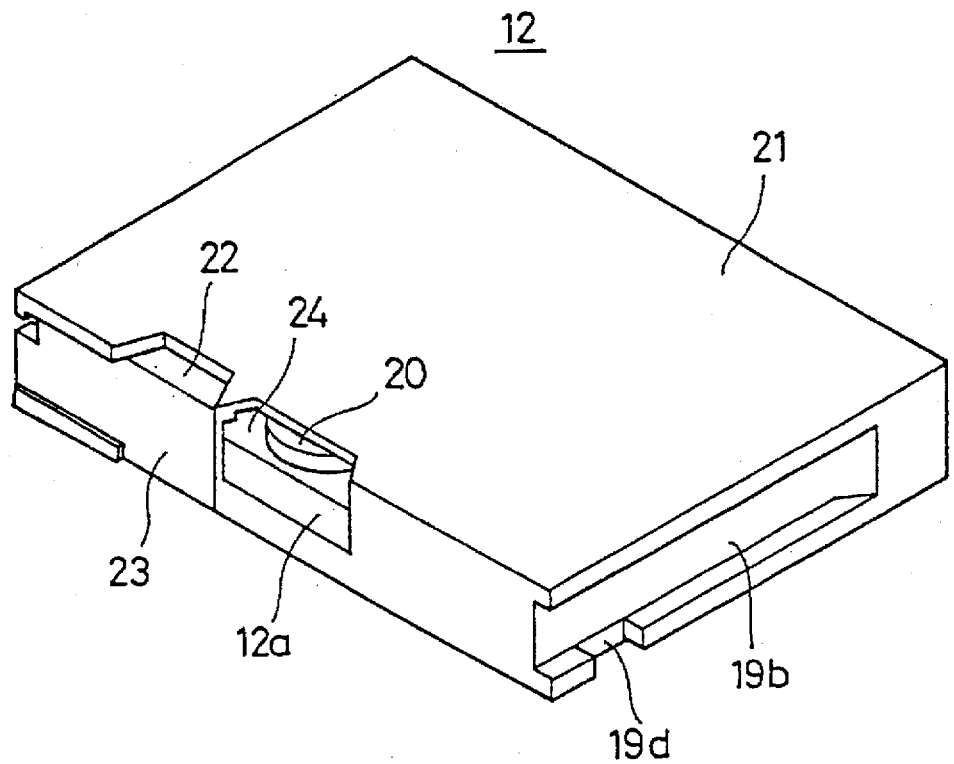
FIGS. 2A and 2B are isometric views of a data cartridge.
Figure 2B:
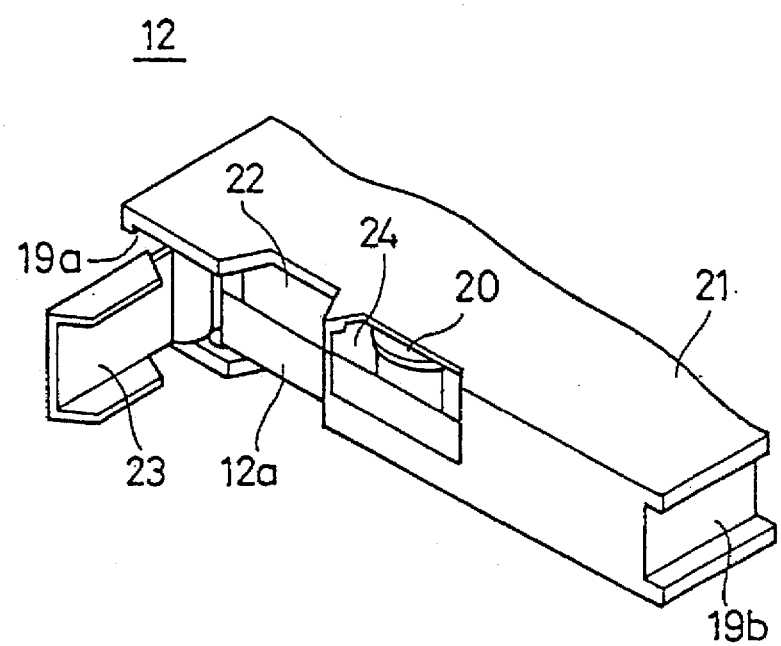
Figure 3A:
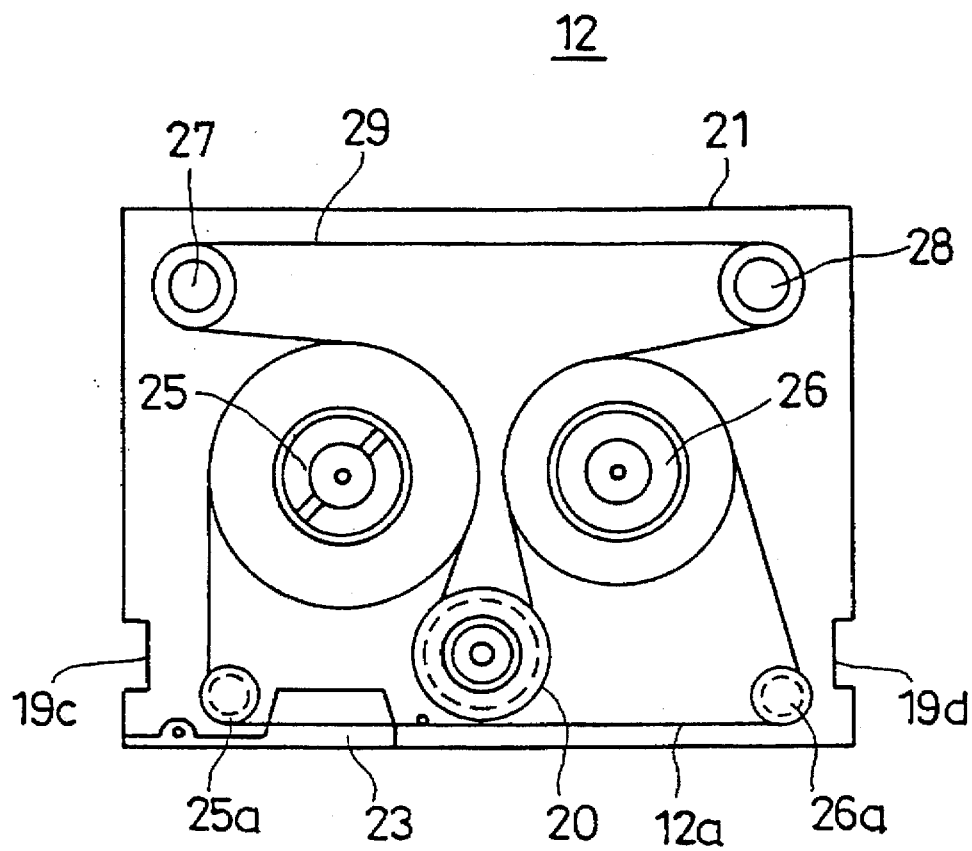
FIGS. 3A and 3B are a plan view and a front view of a data cartridge, respectively.
Figure 3B:
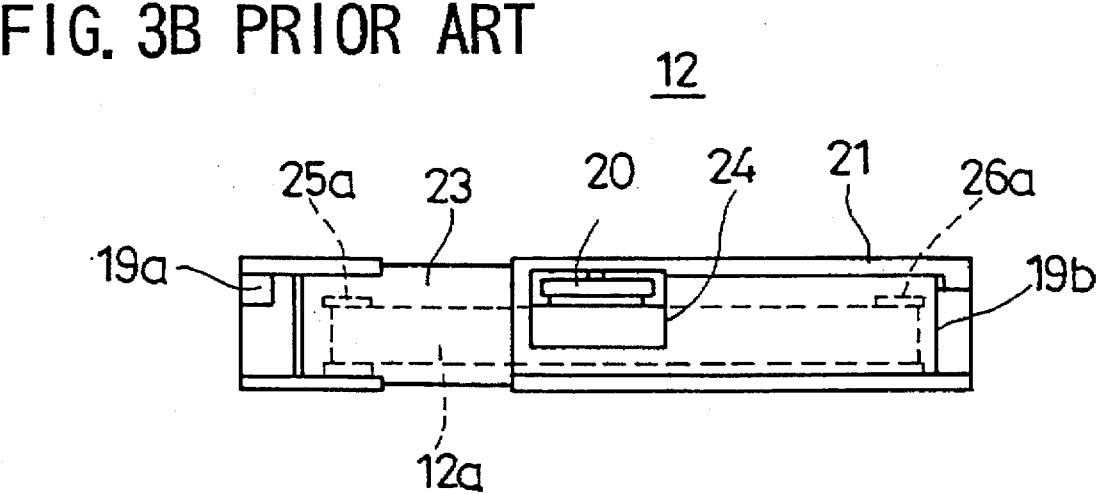
Figure 4:
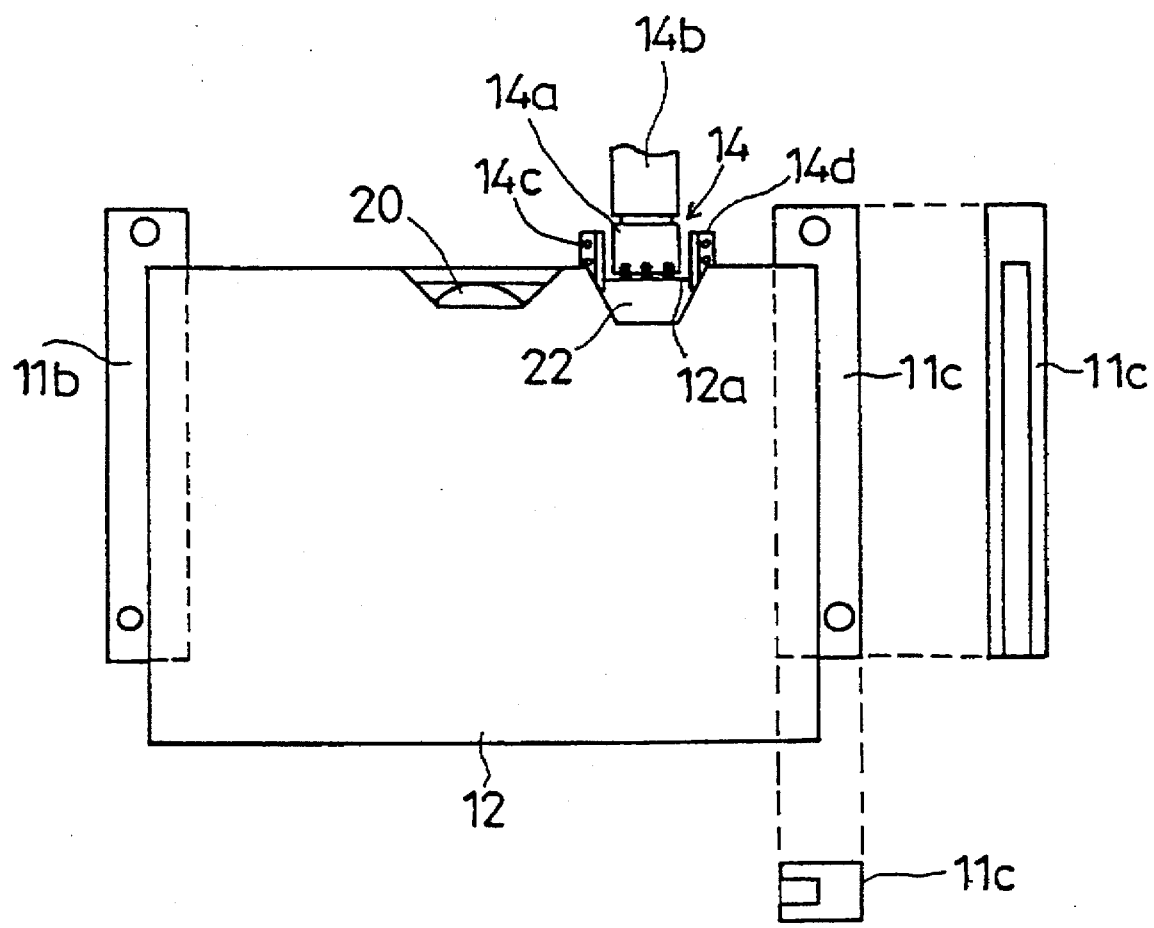
FIG. 4 is a plan view of a data cartridge and a magnetic head unit when the data cartridge is inserted into a magnetic tape memory device.
Figure 7:
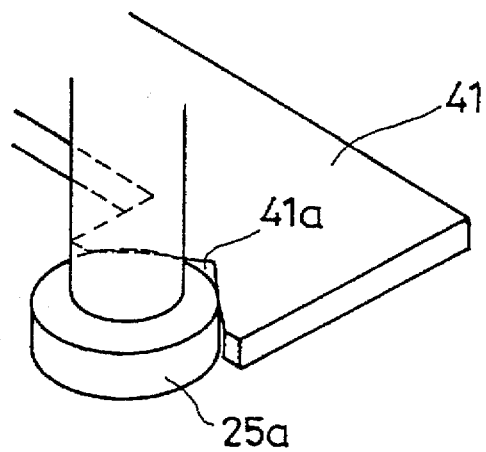
FIG. 7 is an isometric view showing the relation between a guide roller and a cartridge guide in the positioning of the data cartridge in the magnetic tape memory device according to the present invention.

FIG. 7 is a drawing illustrating how the cartridge guide 41 positions the data cartridge 12. With reference again to FIG. 5, when the data cartridge 12 is inserted into the magnetic tape memory device 31, the stopper 34 positions the right hand side of the front face of the data cartridge 12, and the left hand side of the front face of the data cartridge 12, which is the point where the magnetic heads 36 encounter the magnetic tape 12a, is positioned by the cartridge guide 41. As shown in FIG. 2B, when the lid 23 is opened, the guide roller 25a is exposed and is fit into the cut 41a of the cartridge guide 41. With this configuration of the guide roller 25a and the cartridge guide 41, the data cartridge 12 is positioned relative to the magnetic heads 36 in the direction perpendicular to the surface of and the direction along the length of the magnetic tape 12a. Since the guide roller 25a is a cylinder fixed on the cassette 21 and the magnetic tape 12a slides on the guide roller 25a, the driving of the magnetic tape 12a is not affected at all when the cartridge guide 41 is pushed against the guide roller 25a.

As described above, the magnetic tape 12a is positioned relative to the tape guides 40a and 40b by means of the cartridge guide 41 which comes in contact with the guide roller 25a instead of the cassette 21. The magnetic tape 12a is stretched by the guide rollers 25a and 26a inside the cassette 21, and the tape guides 40a and 40b come in contact with the magnetic tape 12a in the proximity of the guide roller 25a. Thus, the positioning of the magnetic tape 12a based on the guide roller 25a is almost equivalent to the direct positioning of the magnetic tape 12a itself. Accordingly, the positioning of the magnetic tape 12a based on the positioning of the guide roller 25a is not affected by variations in the positions of the guide rollers 25a and 26a in the cassette 21 as much as it is when the positioning is based on the cassette 21.

Because of the reason described above, an appropriate amount of pressure is applied by the tape guides 40a and 40b on the magnetic tape 12a. At the same time, the magnetic tape 12a is fit into the cuts on the tape guides 40a and 40b to be positioned relative to the magnetic heads 36 in the direction along the width of the magnetic tape 12a. Since the head base 39 and the tape guides 40a and 40b are integrated, variations in the position of the tape guides 40a and 40b relative to the magnetic heads 36 can be made relatively small. Thus, the magnetic tape 12a can be precisely positioned relative to the magnetic heads 36.

In the present invention, the tape guides 40a and 40b, the cartridge guide 41, and the head base 39 can be formed integrally, which leads to an improvement in productivity.

In the preferred embodiment described above, although the cut 41a on the cartridge guide 41 is V-shaped, it can be U-shaped, or can be any shape which enables the guide roller 25a to be fit into it so as to be positioned appropriately. Also, although the above description concerns the effect of the cartridge guide 41 on the positioning of the magnetic tape 12a in the case of a rotating magnetic head, it is apparent that the identical effect can be obtained in the case of a magnetic head of a fixed type.

Further, the present invention is not limited to these embodiments, but various variations and modifications may be made without departing from the scope of the present invention.

What is claimed is:

1. A magnetic tape memory device in which a data cartridge containing a magnetic tape stretched by guide rollers is inserted along a direction of insertion to an operative position in said device at which recording or reproducing of information to or from an exposed portion of the tape occurs, said exposed portion of said tape extending in a direction generally transverse to the direction of insertion when said data cartridge is in said operative position, the location of said guide rollers in said data cartridge being fixed with respect to said data cartridge and establishing the position of said exposed tape portion with respect to said cartridge along a direction parallel to said direction of insertion, one of said guide rollers being externally accessible when said data cartridge is in said operative position, said magnetic tape memory device comprising:

head means mounted in said device to face said exposed portion of said tape, said head means engaging said exposed portion of said tape when said data cartridge is inserted in said device to said operative position for recording or reproducing information to or from the exposed portion of said tape, said head means presenting an exposed frontal surface extending across said head that faces said tape; and positioning means having a fixed predetermined positional relationship with respect to said head means, said positioning means extending away from said head means in said transverse direction and engaging said one of said fixed guide rollers in said data cartridge at a point that is spaced from said head along said transverse direction and is beyond the exposed frontal surface of said head, said positioning means having an end portion configured to contact said externally accessible one of said fixed guide rollers when said data cartridge is at said operative position so that the position of said magnetic tape with respect to said head means is established by the engagement of said positioning means and said externally accessible one of said fixed guide rollers.

2. The magnetic tape memory device as claimed in claim 1, further comprising tape guide means for guiding said magnetic tape, wherein said positioning means is attached to said tape guide means.

3. The magnetic tape memory device as claimed in claim 2, wherein said tape guide means is attached to said head means.

4. The magnetic tape memory device as claimed in claim 3, wherein said tape guide means has grooves for preventing said magnetic tape from moving in the direction along the width of said magnetic tape.

5. The magnetic tape memory device as claimed in claim 4, wherein said positioning means has a recess for engaging said one of said guide rollers.

6. The magnetic tape memory device as claimed in claim 5, where said recess is V-shaped.

* * * * *